US009632798B2

(12) United States Patent
Temporelli et al.

(10) Patent No.: US 9,632,798 B2
(45) Date of Patent: Apr. 25, 2017

(54) METHOD AND DEVICE FOR OPTIMIZING LOADING AND BOOTING OF AN OPERATING SYSTEM IN A COMPUTER SYSTEM VIA A COMMUNICATION NETWORK

(75) Inventors: Frederic Temporelli, Echirolles (FR); Benoit Welterlen, Grenoble (FR)

(73) Assignee: BULL SAS, Les Clayes sous Bois (FR)

( * ) Notice: Subject to any disclaimer, the term of this patent is extended or adjusted under 35 U.S.C. 154(b) by 407 days.

(21) Appl. No.: 13/636,664

(22) PCT Filed: Mar. 18, 2011

(86) PCT No.: PCT/FR2011/050560
§ 371 (c)(1),
(2), (4) Date: Sep. 21, 2012

(87) PCT Pub. No.: WO2011/117516
PCT Pub. Date: Sep. 29, 2011

(65) Prior Publication Data
US 2013/0013910 A1    Jan. 10, 2013

(30) Foreign Application Priority Data
Mar. 22, 2010  (FR) ..................................... 10 52055

(51) Int. Cl.
*G06F 9/44*    (2006.01)
(52) U.S. Cl.
CPC .......... *G06F 9/4416* (2013.01); *G06F 9/4401* (2013.01)
(58) Field of Classification Search
CPC ......... G06F 9/4401; G06F 9/06; G06F 9/4416
(Continued)

(56) References Cited

U.S. PATENT DOCUMENTS 5,113,522 A * 5/1992 Dinwiddie et al. ........... 713/375
7,672,239 B1 * 3/2010 Tripathi et al. ............... 370/235
(Continued)

FOREIGN PATENT DOCUMENTS

JP    2002/182921    6/2002
WO    WO 03/090109 A1    10/2003

OTHER PUBLICATIONS

PCT International Search Report for PCT Application No. PCT/FR2011/050560, mailed Jul. 20, 2011.

*Primary Examiner* — Thomas Lee
*Assistant Examiner* — Santosh R Poudel
(74) *Attorney, Agent, or Firm* — Pillsbury Winthrop Shaw Pittman LLP

(57) ABSTRACT

A method of operating a computer system in communications, via a communication network, with a server comprising an image of a kernel of a minimal operating system and an image of an associated file system for the computer system includes loading, via the communication network, the kernel image from the server to the computer system in accordance with a network transfer protocol interface, and loading, via the communication network, the file system image from the server to the computer system in accordance with the same network transfer protocol interface used to load the kernel image, wherein the loading of the kernel image from the server to the computer system is launched before the loading of the file system image from the server to the computer system is completed, and wherein the loading of the file system image from the server to the computer system is launched before the loading of the kernel image from the server to the computer system is completed.

16 Claims, 4 Drawing Sheets

(58) Field of Classification Search
USPC .............................................................. 713/2
See application file for complete search history.

(56) References Cited

U.S. PATENT DOCUMENTS

| | | | |
|---|---|---|---|
| 8,112,505 | B1* | 2/2012 | Ben-Shaul et al. ............ 709/219 |
| 8,352,624 | B2* | 1/2013 | Zimmerman et al. ......... 709/231 |
| 8,639,917 | B1* | 1/2014 | Ben-Shaul et al. ................ 713/2 |
| 2002/0037091 | A1* | 3/2002 | Terasaki ........................ 382/100 |
| 2004/0172476 | A1 | 9/2004 | Chapweske |
| 2006/0117172 | A1* | 6/2006 | Zhang et al. ...................... 713/2 |
| 2006/0174099 | A1* | 8/2006 | Wang ................................ 713/1 |
| 2007/0073978 | A1* | 3/2007 | Lee ............................... 711/141 |
| 2008/0201571 | A1* | 8/2008 | Sethuraman et al. ............. 713/2 |
| 2008/0235438 | A1* | 9/2008 | Zhang ........................... 711/103 |
| 2008/0263349 | A1* | 10/2008 | Ota et al. .......................... 713/2 |
| 2008/0313685 | A1* | 12/2008 | Rajakarunanayake  H04N 7/17318 725/98 |
| 2009/0013157 | A1* | 1/2009 | Beaule .......................... 712/225 |
| 2009/0037723 | A1* | 2/2009 | Haustein et al. ................. 713/2 |
| 2009/0100129 | A1* | 4/2009 | Vigil et al. .................... 709/203 |
| 2009/0147801 | A1* | 6/2009 | Terashima .................... 370/468 |
| 2010/0122246 | A1* | 5/2010 | Gesquiere et al. ............ 717/173 |
| 2010/0191946 | A1* | 7/2010 | Cheston .................... G06F 3/06 713/2 |
| 2010/0268927 | A1* | 10/2010 | De Ven ............................ 713/2 |
| 2012/0272223 | A1* | 10/2012 | Persson et al. ............... 717/140 |

\* cited by examiner

METHOD AND DEVICE FOR OPTIMIZING LOADING AND BOOTING OF AN OPERATING SYSTEM IN A COMPUTER SYSTEM VIA A COMMUNICATION NETWORK

CROSS-REFERENCE TO RELATED APPLICATIONS

This application is a U.S. National Phase under 35 U.S.C. §371 of International Application PCT/FR2011/050560, filed Mar. 18, 2011, which designated the U.S., and which claims priority under 35 U.S.C. §119 to French Patent Application Number 1052055, filed on Mar. 22, 2010. The disclosures of the above-described applications are hereby expressly incorporated by reference in their entireties.

The present invention concerns the booting of an operating system and more particularly a method, a computer program and a device for optimizing loading and booting of an operating system in a computer system via a communication network.

The procedure of booting a computer system is intended to obtain an operating system, accessible via a permanent or removable storage peripheral, which then enables the loading and the execution of software applications. The operating system is obtained via a simpler program, called bootloader, executed by the BIOS (acronym for Basic Input Output System) generally contained in a read only memory of the computer system's mother board.

During this booting phase, all the software components that are essential and necessary for the operation of the computer system are loaded into random access memory.

It is generally possible to parameterize the BIOS so as, for example, to define the order of the peripherals to check in order to detect a boot sector. It is thus possible to start a computer system via a network by obtaining an image of the operating system available on a remote storage system in the network. Such a booting procedure is in particular known under the name PXE (standing for Pre-boot eXecution Environment) or gPXE (open-source version of PXE which may be used in a network of InfiniBand or Ethernet type—InfiniBand and Ethernet being trademarks).

In this procedure, the specific components and directives for executing the operating system are obtained by loading various files. More particularly, in the context of a Linux operating system loaded from a network (Linux being a trademark), the minimal operating system is typically composed of at least a kernel and a file system generally called initrd (acronym for initial RAM disk).

According to the configuration implemented, this initrd file system may then be used for directly loading software applications or for giving access to a more complete file system which may then be used by the operating system. It is necessary to have both of these components (kernel and initrd) to boot the minimal operating system.

When these components have been loaded, in the form of images, the operating system may then be booted by executing the program contained in the kernel image.

FIG. 1 is a diagram of a boot sequence, in accordance with the gPXE protocol, between a server and a client, in order to have a Linux operating system on a computer system based on images accessible via a communication network.

As illustrated, a client 100 is connected here to a server 105 via a communication network 110. A first step, referenced 115, consists of searching for an IP (standing for Internet Protocol) configuration on a DHCP (standing for Dynamic Host Configuration Protocol) server. In addition to the IP configuration information, the response 120 of the DHCP server indicates a location of a file of gPXE directives. The location of this directive file also makes it possible to define the transfer protocol that has to be used.

After having obtained an IP configuration and a directive file location from the DHCP server, the client sends a request 125 to the server to perform the transfer of the located directive file. In response (referenced 130), the directive file is received from the server. Typically, the received directive file defines the location of a kernel file (image of the kernel), the location of an initrd file (image of the associated file system) and parameters to be addressed to the kernel.

The client then sends a request 135 for obtaining the kernel file which is received from the server (reference 140) in response to that request. Next, in similar manner, the client sends a request 145 for obtaining the initrd file which is received from the server (reference 150) in response to that request.

It is to be noted here that, in the context of use of the gPXE protocol, file requests and transfers generally use the TFTP (standing for Trivial File Transfer Protocol) or HTTP (standing for HyperText Transfer Protocol) protocols. When the PXE protocol is used, only a TFTP transfer protocol is used. Furthermore, when the PXE protocol is used, the directive file uses a different syntax and an additional exchange between the client and the server is performed before loading the directive file.

After loading the kernel and initrd files into memory, the bootloader ends by passing on to the execution of the point of entry of the kernel which then uses the file system supplied by the initrd file. This booting of the operating system continues, in general, by the accessing of a more complete file system via the network and with the use of that file system to replace the initrd file system.

Similarly, according to the PXE protocol, the essential phases of implementation of the minimal operating system are, after the obtaining of a network configuration, the loading of a PXE code extension, for example the pxelinux file, then the loading of the following loading directives, then the loading of an image of the kernel (kernel file) and then the loading of an image of a file system (initrd file). Consequently, the gPXE protocol is similar to the PXE protocol with the exception of the step of loading a PXE code extension which is not necessary.

The loading directives here concern the location of the kernel file (protocol and path for that file according to that protocol), the location of the initrd file (protocol and path for that file according to that protocol) and the parameters used by the kernel such as, for example, the characteristics for use of serial ports for processing the interactions of a user.

The result of these different steps is that, when the PXE or gPXE protocols are used, the time required between providing power to a computer system and the availability of the operating system is non-negligible and may be particularly disadvantageous, this being all the more the case in computer systems in a flexible environment for which optimization is particularly high.

The invention enables at least one of the problems set forth above to be solved.

The invention thus relates to a method of loading and booting for a computer system linked to a communication network to which is connected at least one server, said at least one server comprising at least one image of a kernel of a minimal operating system and an image of an associated file system, the method comprising steps of loading said image of said kernel and said image of said file system, one of said steps of loading said image of said kernel and of loading said image of said file system being launched before the end of the execution of the other of said steps of loading said image of said kernel and of loading said image of said file system.

The method according to the invention thus makes it possible to reduce the delay linked to the transfer of the images of a kernel and of a file system on booting an operating system.

Advantageously, said steps of loading said image of said kernel and of loading said image of said file system are launched substantially at the same time. Thus, the time for transfer of the images of a kernel and of a file system is optimized whatever the size of the kernel and file system images.

According to a particular embodiment, the method further comprises a preliminary step of loading directives for loading said image of said kernel and/or said image of said file system. The loading directives preferably comprise information on location of the kernel and file system images, information on the communication protocols used to access those images and/or parameters that may be used by the kernel.

Still according to a particular embodiment, the method further comprises a preliminary step of loading a bootloader, said bootloader comprising instructions for the execution of said steps of loading said image of said kernel and/or of loading said image of said file system.

Still according to a particular embodiment, the protocol for access to said bootloader is a standard protocol of PXE or gPXE type.

The protocol for loading said image of said kernel and/or for loading said image of said file system is, preferably, a protocol of TFTP type or of HTTP type.

The method according to the invention is particularly adapted for an implementation in a node of a cluster whose optimization is particularly high.

The invention is also directed to a computer program comprising instructions adapted to the implementation of each of the steps of the method described earlier when said program is executed on a computer as well as a device comprising means adapted to the implementation of each of the steps of the method described earlier.

The advantages procured by that computer program and that device are similar to those referred to above.

Other advantages, objects and features of the present invention will emerge from the following detailed description, given by way of non-limiting example, relative to the accompanying drawings in which:

FIG. 1 is a diagram of a boot sequence, in accordance with the gPXE protocol, between a server and a client, in order to have a Linux operating system on a computer system based on images accessible via a communication network;

FIG. 2, comprising FIGS. 2a and 2b, illustrates two examples of computing environments in which the invention may be implemented;

Generally, the invention is directed to parallel loading of the data to be used for booting a computer system, typically a cluster node or a client station, via a communication network. The parallel loading of the data is in particular directed to data linked to the kernel of the operating system and to the associated file system.

Figure 1:
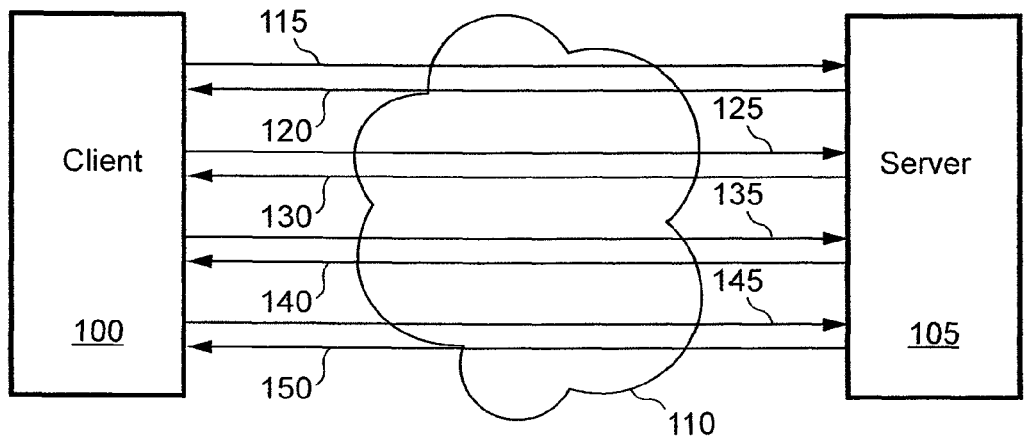
Figure 2A:
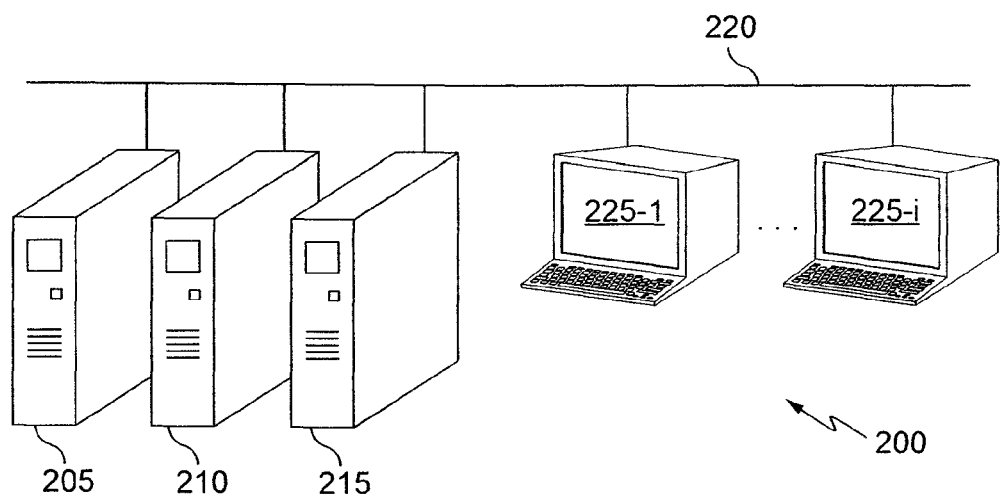
Figure 2B:
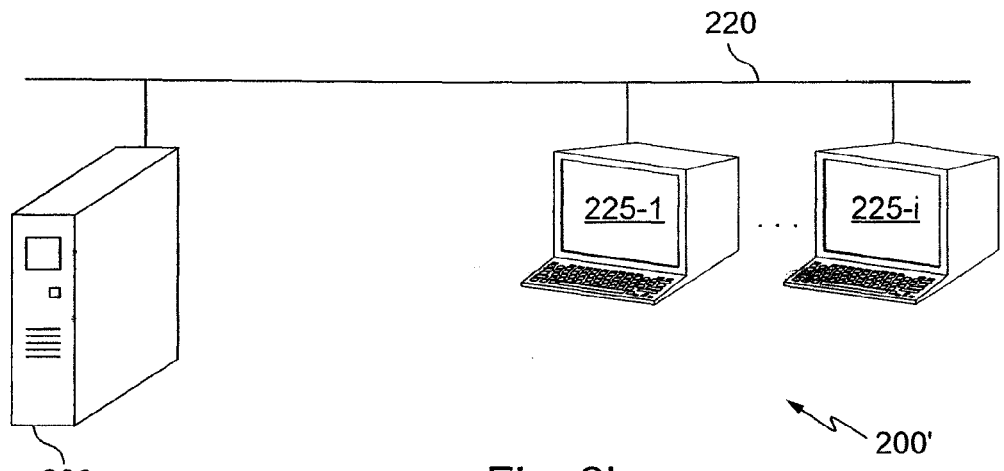

FIG. 2, comprising FIGS. 2a and 2b, illustrates two examples of computing environments in which the invention may be implemented.

As illustrated in FIG. 2a, the computing environment 200 here comprises three servers 205, 210 and 215 linked to a communication network 220, for example an Ethernet or InfiniBand network, to which are also connected nodes of a cluster or client stations referenced 225-1 to 225-i. The server 205 is here an address server, for example a DHCP server, configured to supply a location enabling the continuation of booting for client systems, using, for example, the PXE or gPXE protocols. The server 210 is here a server from which a specific PXE file may be loaded, in particular the file pxelinux, and PXE or gPXE directive files. The server 215 is a server from which an image of a kernel may be loaded, that is to say typically a kernel file, and an image of a file system, that is to say typically an initrd file. The servers 210 and 215 are, for example, TFTP or HTTP file servers.

On booting, each of the nodes or client stations 225-1 to 225-i obtains a network address to identify itself, preferably an IP type address, from the server 205, as well as the location of a PXE extension, for example pxelinux, or of gPXE directives on the server 210. The client stations or nodes may then load PXE or gPXE boot instructions from the server 210, that is to say, in particular, the loading directives and, where applicable, a PXE code extension. Next, depending on the loading directives received, the images of the kernel and of the file system to be used, that is to say, for example, the kernel and initrd files, are transferred from the server 215.

The computing environment 200' represented in FIG. 2b is distinguished from the environment 200 described earlier in that the servers 205, 210 and 215 are grouped together in a single server 230, linked to the communication network 220 to which are also connected the client stations or nodes referenced 225-1 to 225-i. Consequently, the server 230 is a server having an address server function such as a DHCP server and file server for PXE or gPXE, from which may be loaded the images of the kernel and of the file system to be used.

Similarly, it is also possible to use two servers, for example an address server such as a DHCP server, also enabling the transfer of PXE extension and PXE or gPXE directive files, and a server from which may be loaded the images of the kernel and of the file system to be used.

Figure 3:
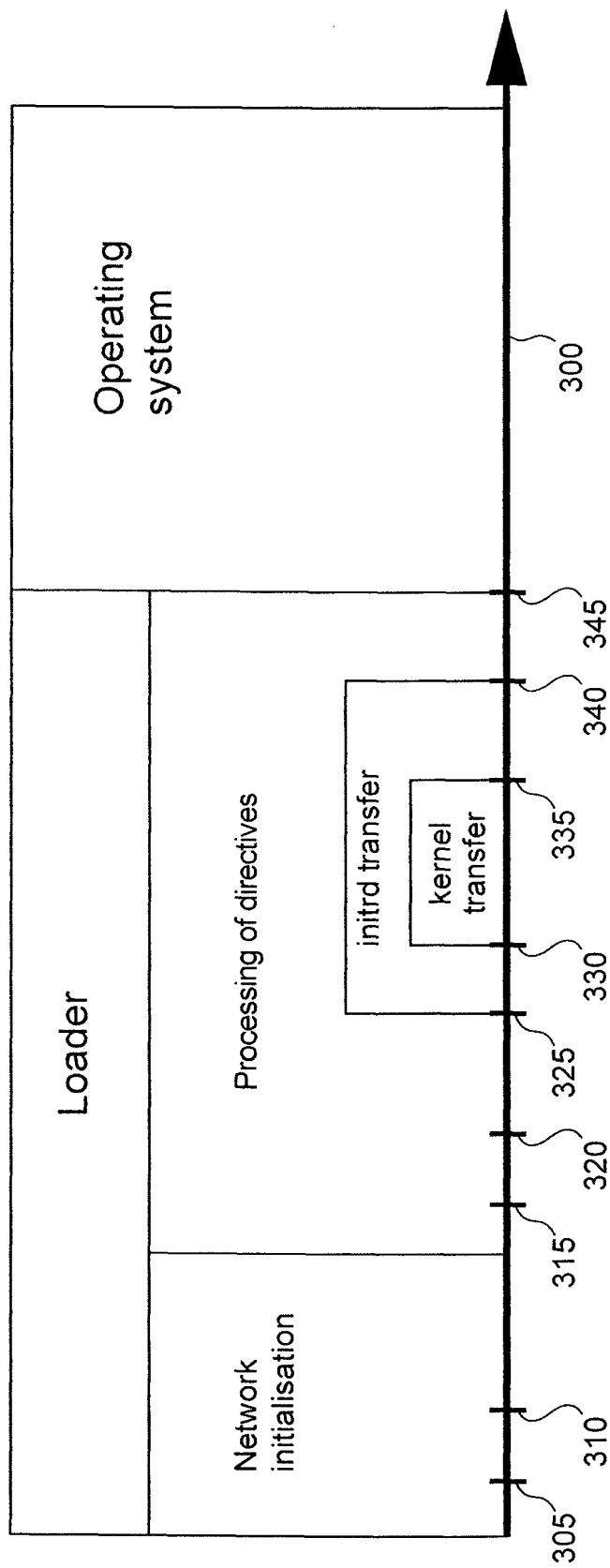
FIG. 3 illustrates certain steps of a boot sequence of a cluster node or of a client station in accordance with the invention.

FIG. 3 illustrates certain steps of a boot sequence of a client station or node in accordance with the invention. These steps are represented on a time line 300.

As illustrated, it is necessary, in a first phase, to obtain a network configuration (step 305) for the client station or node and, if necessary, for the servers from which loading directives may be loaded as well as images of the kernel and of the file system to be used (for example kernel and initrd files).

After the network configuration of the client station or node (step 310), that is to say as soon as the network configuration is known (if the gPXE protocol is used) or when the PXE extension has been loaded (if the PXE protocol is used), the loading of the loading directives begins (step 315).

When the loading directives have been received (step 320), the loading of the images of the kernel and of the file system concerned in the directives (for example kernel and initrd files) may begin (steps 330 and 325, respectively). The loading of the kernel image begins at the same time as that of the file system image or afterwards, but before the file system image has been fully loaded. It is to be noted that, generally, the loading of the file system image continues when the image of the kernel has been loaded (step 335).

The loading of the kernel image may also begin before that of the file system image provided that the latter begins before the kernel image has been fully loaded.

After the kernel and file system images have been loaded (steps 335 and 340), the kernel, that is to say the minimal operating system, is booted (step 345).

It is to be noted that the size of the image of the kernel such as a file kernel is typically comprised between 2 to 5 MB whereas that of the file system such as a file initrd is generally comprised between 2 and 20 MB and may attain 100 MB. Thus, the simultaneous loading of the kernel image and of the file system image enables loading time to be saved for the image of smaller size.

Figure 4:
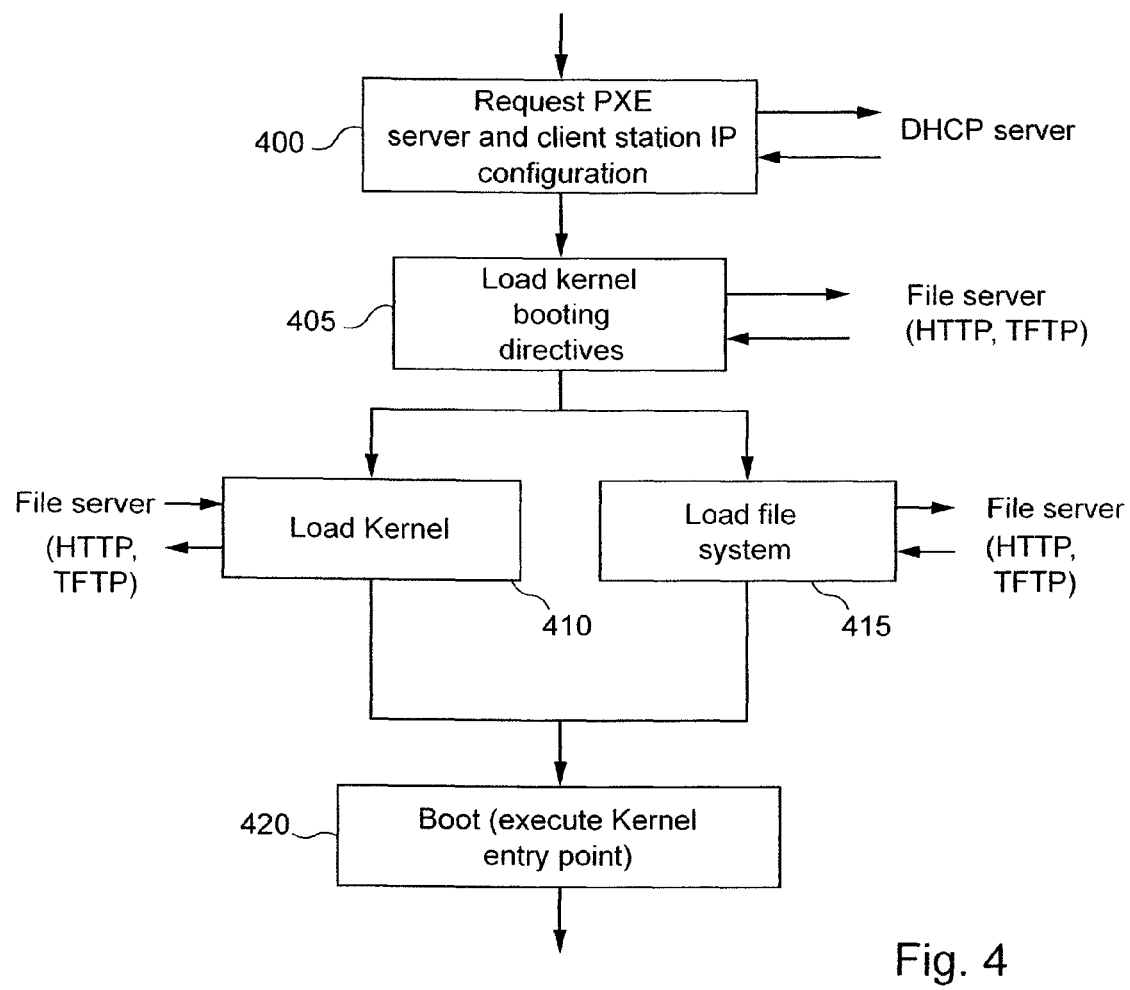
FIG. 4 is a diagram of an example algorithm implemented in a cluster node or a client station for enabling its booting from a communication network; and, FIG. 5 illustrates an example of architecture of a cluster node or of a client station adapted to implement the invention.

FIG. 4 is a diagram of an example algorithm implemented in a cluster node or a client station for enabling its booting from a communication network.

As described earlier, a first step (step 400) consists of a request to obtain a network configuration for that node or that client station, as well as, if necessary for the server or servers from which may be loaded the loading directives as well as the images of the kernel and of the file system to be used. By way of illustration, the BIOS of the node or of the client station requests its IP address as well as the IP address of a PXE or gPXE server according to the DHCP protocol.

In a following step (step 405), the node or the client station loads the loading directives from the PXE or gPXE server whose address was obtained previously. Again, this request may come from the BIOS of the node or client station. If the protocol used is the PXE protocol, this step comprises a preliminary step of loading a PXE code extension, for example pxelinux. The booting program or bootloader of the node or of the client station (if the gPXE protocol is used) or received from the PXE server (if the PXE protocol is used) makes it possible, in combination with the loading directives, to launch the loading of the image of the kernel and of the image of the file system.

It is to be noted here that the addresses of the server or servers enabling the loading of the kernel and the file system images are generally given in the loading directives. Alternatively, they may be obtained via a separate request from the node or from the client station to an address server.

The node or the client station then launches the loading of the images of the kernel of the minimal operating system (step 410) and of its file system (step 415). For these purposes, to launch the simultaneous loading of the images of the kernel and of the corresponding file system, the bootstrap protocol (pxelinux or gPXE) is modified in order for the loading requests not to be processed sequentially.

According to a particular embodiment, a notification of the loading directives enables such a functionality to be activated or inhibited.

As already indicated, the images of the kernel and of the corresponding file system may be obtained from the same server or from distinct servers. If they are obtained from distinct servers, there is no conflict for the access to the files and the processing of the loading requests. In the opposite case, the loading operations are processed in parallel by the file server.

A waiting mechanism is then advantageously implemented to ensure that the images of the kernel and of the file system are fully loaded into memory before continuing the booting of the operating system.

The execution of the kernel entry point (step 420) terminates the processing for loading the images of the kernel and of the file system and begins the booting of the operating system.

Figure 5:
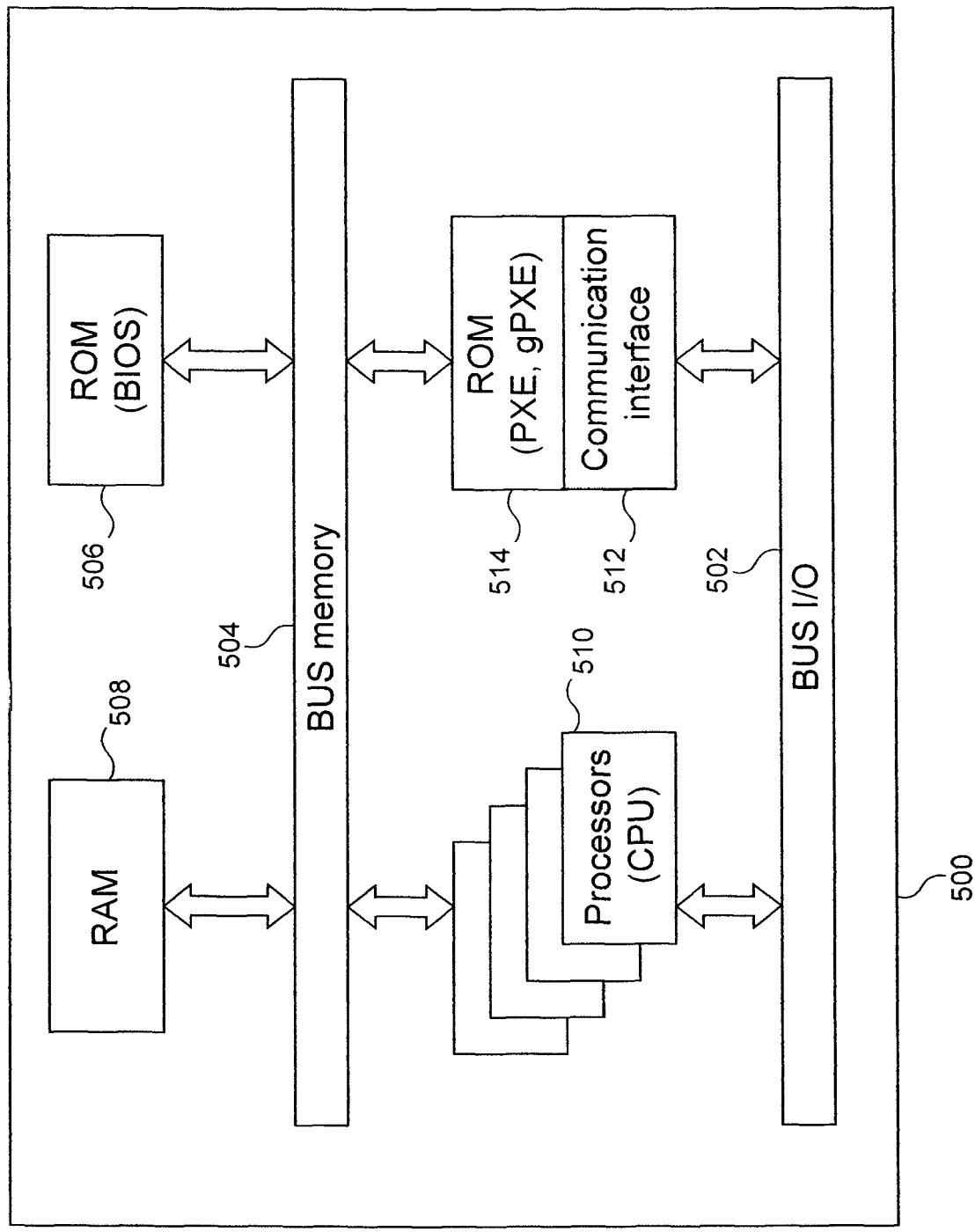

An example of architecture for a cluster node or for a client station adapted to implement the algorithm described with reference to FIG. 4 is illustrated in FIG. 5.

The device 500 here comprises a communication bus 502 enabling the exchange of data with elements that are external to the device 500 (input/output bus) and a communication bus 504 dedicated to the exchanges of data with a memory.

A ROM (acronym for Read Only Memory) 506 containing the BIOS program of the system as well as a RAM (acronym for Random Access Memory) 508 comprising registers adapted to record variables and parameters created and modified during the execution of the aforementioned programs as well as the kernel and the file system are connected to the bus 504.

One or more CPUs (standing for Central Processing Units) or microprocessors 510 as well as a communication interface 512 which is adapted to send and receive data over a network are connected to the buses 502 and 504. The communication interface 512 here comprises an expansion ROM 514, which contains a program enabling the booting of the operating system used over a network.

The communication buses 502 and 504 allow communication and interoperability between the different elements included in the device 500 or connected to it. The representation of the buses is non-limiting and, in particular, the central processing units may communicate instructions to any element of the device 500 directly or by means of another element of the device 500.

The executable code of each program enabling the programmable device to implement the methods according to the invention may be stored, for example, in the expansion ROM 514. The gPXE protocol also enables those software components to be loaded into the RAM 508.

More generally, the program or programs may be loaded into one of the storage means of the device 500 before being executed.

The central processing units 510 control and direct the execution of the instructions or portions of software code or of the programs according to the invention, which instructions are stored in the expansion ROM 514, in the RAM 506 or in any other aforementioned storage element.

Naturally, to satisfy specific needs, a person skilled in the art will be able to make amendments to the preceding description.

The invention claimed is:

1. A method of operating a computer system in communications, via a communication network, with a server comprising an image of a kernel of a minimal operating system and an image of an associated file system for the computer system, the method comprising:
   loading, via the communication network, the kernel image from the server to the computer system in accordance with a network transfer protocol; and
   loading, via the communication network, the file system image from the server to the computer system in accordance with the same network transfer protocol used to load the kernel image,
   performing transfer of PXE extension and directive files from a second server different than the server comprising the image of a kernel and the image of the file system before the loading of the kernel image and the file system;

wherein the loading of the kernel image from the server to the computer system is launched before the loading of the file system image from the server to the computer system is completed, and wherein the loading of the file system image from the server to the computer system is launched before the loading of the kernel image from the server to the computer system is completed.

2. The method of claim 1, wherein the loading of the kernel image and the loading of the file system image are launched in an overlapping/parallel manner.

3. The method of claim 1, further comprising loading a bootloader, comprising instructions for at least one of loading the kernel image and loading the file system image.

4. The method of claim 3, wherein a protocol used in the method for access to the bootloader is a protocol of PXE type.

5. The method of claim 3, wherein the protocol used in the method for access to the bootloader is a protocol of gPXE type.

6. The method of claim 1, wherein the network transfer protocol used for at least one of loading the kernel image and loading the file system image is of a TFTP protocol type or an HTTP protocol type.

7. The method of claim 1, wherein the computer system comprises a node of a cluster.

8. A non-transitory computer readable medium comprising instructions, which, when executed cause the computer to perform a method, wherein the computer is in communications, via a communication network, with a server comprising an image of a kernel of a minimal operating system and an image of an associated file system, the method comprising:

loading, via the communication network, the kernel image from the server to the computer system in accordance with a network transfer protocol; and loading, via the communication network, the file system image from the server to the computer system in accordance with the same network transfer protocol used to load the kernel image, performing transfer of PXE extension and directive files from a second server different than the server comprising the image of a kernel and the image of the file system before the loading of the kernel image and the file system;

wherein the loading of the kernel image from the server to the computer system is launched before the loading of the file system image from the server to the computer system is completed, and wherein the loading of the file system image from the server to the computer system is launched before the loading of the kernel image from the server to the computer system is completed.

9. The non-transitory computer readable medium of claim 8, wherein the loading of the kernel image and the loading of the file system image are launched in an overlapping/parallel manner.

10. The non-transitory computer readable medium of claim 8, further comprising loading directives for at least one of loading the kernel image and loading the file system image.

11. A computer device in communications, via a network, with a server comprising an image of a kernel of a minimal operating system and an image of an associated file system, the device comprising:

means for loading, via the communication network, the kernel image from the server to the computer system in accordance with a network transfer protocol; and means for loading, via the communication network, the file system image from the server to the computer system in accordance with the same network transfer protocol used to load the kernel image, performing transfer of PXE extension and directive files from a second server different than the server comprising the image of a kernel and the image of the file system before the loading of the kernel image and the file system;

wherein the loading of the kernel image from the server to the computer system is launched before the loading of the file system image from the server to the computer system is completed, and wherein the loading of the file system image from the server to the computer system is launched before the loading of the kernel image from the server to the computer system is completed.

12. The computer device of claim 11, wherein the means for loading the kernel image to the computer system, and the means for loading the file system image to the computer system comprise a network communication bus and a memory.

13. The computer device of claim 11, wherein the means for loading the kernel image to the computer system, and the means for loading the file system image to the computer system are configured to respectively launch the loading of the kernel image and the loading of the file system in an overlapping/parallel manner.

14. A computer device in communications, via a network, with a server comprising an image of a kernel of a minimal operating system and an image of an associated file system, the computer device comprising:

a memory;

a network communication bus coupled to the memory; and a processor, wherein the processor is configured to load the kernel image from the server to the memory via the network communication bus, and to load the image to the memory via the network communication bus in accordance with a same network transfer protocol and to perform transfer of PXE extension and directive files from a second server different than the server comprising the image of a kernel and the image of the file system before the loading of the kernel image and the file system;

wherein the loading of the kernel image from the server to the computer system is launched before the loading of the file system image from the server to the computer system is completed, and wherein the loading of the file system image from the server to the computer system is launched before the loading of the kernel image from the server to the computer system is completed.

15. The computer device of claim 14, wherein the processor is configured to launch the loading of the kernel image and the loading of the file system image are launched in an overlapping/parallel manner.

16. The computer device of claim 14, wherein the processor is configured to load a bootloader, comprising instructions for at least one of loading the kernel image and loading the file system image.

* * * * *